Sept. 30, 1930.  H. T. SEELEY  1,777,230

AUTOMATIC CONTROL EQUIPMENT

Filed Oct. 13, 1928

Inventor:
Harold T. Seeley,
by Charles E. Tullar
His Attorney.

Patented Sept. 30, 1930

1,777,230

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

AUTOMATIC CONTROL EQUIPMENT

Application filed October 13, 1928. Serial No. 312,377.

My invention relates to automatic control equipments and particularly to automatic control equipments for automatically synchronizing a synchronous generator with the circuit to which it is to be connected and the object of my invention is to provide an improved synchronizing arrangement for accomplishing this result.

My invention is particularly applicable to a system for synchronizing a synchronous frequency converter which is adapted to be connected between two alternating current circuits which are tied together by other synchronous frequency converters. In accordance with my invention, I provide an arrangement for reversing the excitation of one of the synchronous machines constituting the frequency converter when the converter is not substantially in synchronism with the circuit to which it is to supply current.

My invention will be better understood from the following description when taken in connection with the accompanying drawing and its scope will be pointed out in the appended claims.

Figure 1:
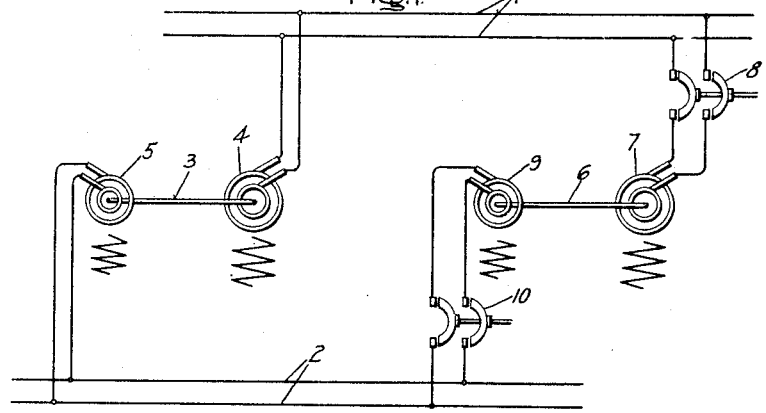
Figure 2:
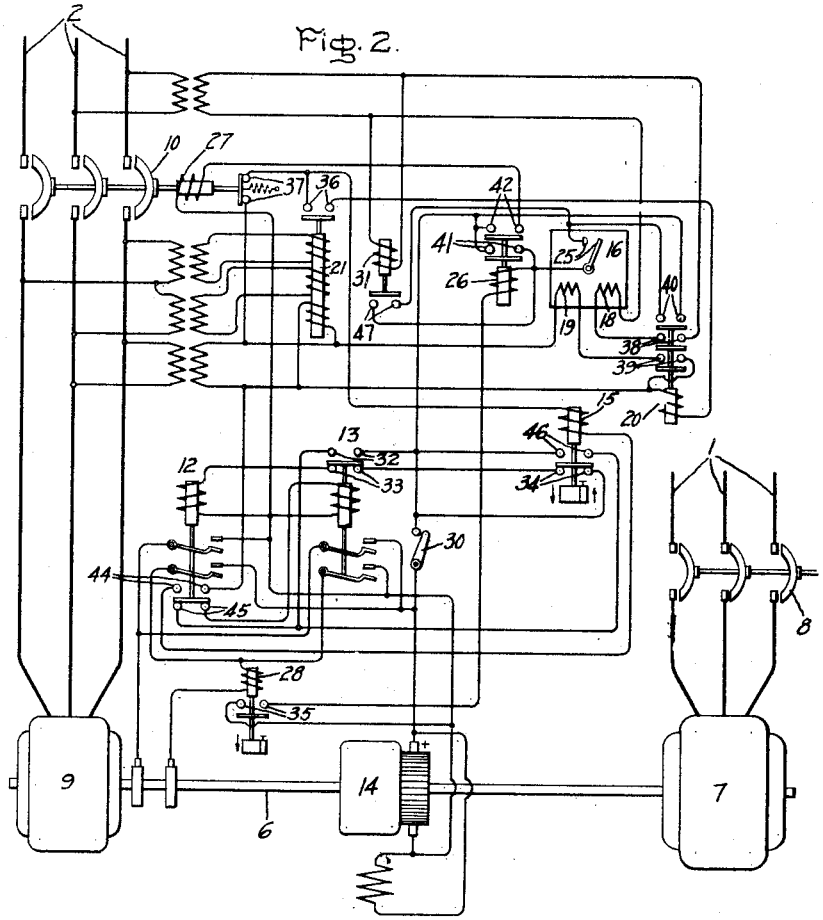

In the accompanying drawing, Fig. 1 shows diagrammatically a system of distribution to which my invention is particularly applicable, and Fig. 2 shows diagrammatically an automatic control equipment for a synchronous generator embodying my invention which may be used to control one of the machines of Fig. 1.

Referring to Fig. 1, 1 and 2 represent two alternating current circuits of different frequencies which are connected together by a suitable synchronous frequency converter 3 comprising a synchronous motor 4 connected to the circuit 1 and driving a synchronous generator 5 which is connected to the circuit 2. 6 represents another synchronous frequency converter and comprises a synchronous motor 7 which is adapted to be connected to the circuit 1 by means of a suitable switch 8 and a synchronous generator 9 which is adapted to be connected to the circuit 2 by means of a suitable switch 10.

When the frequency converter 6 is placed in operation, the synchronous generator 9 should be substantially in phase with the alternating current circuit 2 before the switch 10 is closed. When the synchronous motor 7 of the converter 6 is a four pole machine, there is a possibility however, of the motor pulling in synchronism when it is started so that the voltage of generator 9 is either substantially in phase with the voltage of circuit 2 or substantially 180° electrical degrees out of phase therewith assuming always the same direction of excitation. In accordance with my invention, I provide an arrangement whereby if the motor 7 pulls into synchronism so that the generator 9 is substantially 180° electrical degrees out of synchronism with the circuit 2, the excitation of one of the machines constituting the converter is reversed so as to bring the generator 9 into synchronism with the circuit 2 before the generator is connected to the circuit 2.

Referring to Fig. 2, which shows diagrammatically an automatic control arrangement embodying my invention for controlling the connections of the generator 9, 12 and 13 represent reversing switches whereby the connections of the field winding of the synchronous generator 9 to a source of excitation, which in the drawing is shown as a direct connected exciter 14, may be reversed. Under normal conditions when the converter is started, the switch 12 is closed first. If the generator 9 is not connected to the circuit 2 within a predetermined time interval after the switch 12 is closed, a time relay 15 is arranged to operate to effect the opening of the switch 12 and the closing of the switch 13 so as to reverse the connections of the generator field winding across the exciter 14.

Any suitable synchronizing means, examples of which are well known in the art may be provided for controlling the closing of the switch 10 between the generator 9 and the circuit 2 so that it is closed only when the generator and circuit are substantially in phase. As shown in the drawing the synchronizing means comprises a synchronizing check relay 16 which is arranged to close its contacts and effect the closing of the switch 10 only when the phase difference between the voltages of the generator and the circuit is less than a predetermined value for a predetermined time. The synchronizing check relay 16 may be of any suitable type, examples of which are well known in the art. As shown in the drawing the relay 16 includes two voltage windings 18 and 19 which are arranged to be connected so as to be energized in response to the voltages of the circuit 2 and the generator 9 respectively when a control relay 20 is energized. The control relay 20 in turn is controlled by a polyphase voltage relay 21 which is responsive to the polyphase voltage of the generator 9. The synchronizing check relay 16 therefore is rendered operative to effect the closing of the switch 10 only when voltages of all of the phases of the generator 9 are normal.

Since the voltage of the circuit 2 lags the open circuit voltage of the generator 9 by an amount which depends upon the amount of load connected to the circuit 2 and this amount of lag may be as much as 75° in some cases, the relay 16 has to be arranged in such a case to effect the closing of the switch 10 when the phase difference is 75° or less and not to effect the closing of the switch 10 when the phase difference is 105° which would be the minimum phase difference that could occur with the excitation of the generator 9 reversed. The relay 16 in such a case would have an inoperative range of only 30° which would be too small for good operation. This inoperative range of phase difference may be made considerably greater by changing the constants of either or both of the circuits of the voltage windings of the relay 16 so that when the voltages of the generator 9 and the circuit 2 are exactly in phase, the current through the winding 19 which is energized from the generator 9, lags the current in the winding 18 an amount equal to one half the range through which the voltage of circuit 2 may vary with respect to the no load voltage of the generator 9 as the load varies. For example, if the range through which the voltage of circuit 2 may vary with respect to the no load voltage of the generator 9, is from 0 to 75° and the relay 16 is designed so that circuit of the winding 19 has a 37½° lag with respect to the circuit of the winding 18 and will close its contacts when the phase difference between the currents in the two windings 18 and 19 is 37½° or less, the relay 16 will then close its contacts when voltage of the generator is in phase with or leads the voltage of circuit 2 75° or less. Therefore the maximum phase difference which can occur between the currents in the windings 18 and 19 during this 75° range of voltage phase difference when the generator 9 is excited in the proper direction is only 37½°. In case the generator 9 is excited in the wrong direction, the minimum phase difference that can occur between the currents in the windings 18 and 19 is 180°−37½° or 142½°. Therefore, the synchronizing check relay now has to distinguish between 37½° and 142½°, a range of 105° which is sufficient to give satisfactory operation.

The synchronizing check relay 16 when it closes its contacts 25 is arranged to complete the circuit of an auxiliary control relay 26 which in turn, when energized, effects the energization of the closing coil 27 of the switch 10. In order to prevent the closing of the switch 10 in case the field circuit of the generator 9 is not energized the circuit of the control relay 26 also includes contacts 35 of a field relay 28 which is connected so as to be energized in accordance with the current through the generator field circuit.

30 represents a master control switch which is operated when it is desired to connect the generator to the circuit 2. This switch 30 has to be closed before the generator can be connected to the circuit 2. As shown in the drawing it is a manually controlled switch but in practice it may be automatically controlled in any suitable manner so that it closes after the frequency converter has been started from rest and the generator thereof is in a condition to be connected to the circuit 2.

In order that the generator 9 may be connected to the circuit 2 independently of the synchronizing check relay 16 when the circuit 2 is deenergized I provide a voltage relay 31 which is connected so that it is responsive to the voltage of circuit 2. The relay 31 when deenergized is arranged to complete a circuit for the control relay 26 independently of the contacts 25 of relay 16.

The operation of the arrangement shown in Fig. 2 is as follows: It will be assumed that frequency converter 6 has been started in any suitable manner and that it is being driven by the synchronous motor 7 which is connected to the circuit 1 by the switch 8. The master control switch 30 is then closed so that the coil of switch 12 is connected across the exciter terminals with the contacts 33 of switch 13 and contacts 34 of time relay 15 in series therewith. The closing of switch 12 connects the generator field winding and relay 28 in series across the exciter terminals. As soon as the field current builds up the generator voltage builds up to normal and the field relay 28 closes its contacts 35.

As soon as the generator voltage builds up to normal, voltage relay 21 closes its contacts 36 and thereby completes the circuit of the control relay 20 across a suitable control circuit. The circuit of the relay 20 also includes auxiliary contacts 37 on the switch 10 so that the relay 20 is deenergized when the switch 10 is closed. Relay 20 by closing its contacts 38 and 39 respectively connects the coils 18 and 19 of the relay 16 to the circuit 2 and the generator 9 so that they are energized in response to the respective voltages. When the phase difference between the generator 9 and circuit 2 remains below a predetermined value for a predetermined time relay 16 closes its contacts 25 and completes a circuit for the control relay 26 across the exciter terminals. The circuit of relay 26 also includes contacts 40 of relay 20, contacts 35 of field relay 28 and contacts of the master control switch 30. Relay 26 by closing its contacts 41 completes a locking circuit for itself which is independent of contacts 25 of relay 16 and contact 38 of relay 20, and by closing the contacts 42 completes a circuit for the closing coil 27 of the switch 10 across the exciter terminals so that the generator 9 is connected to the circuit 2. Switch 10 by opening its auxiliary contacts 37 opens the circuit of relay 20, which in turn effects the deenergization of the windings of relay 16.

In case the motor 7 has pulled into synchronism in such a manner that when the switch 12 is closed, the current through the generator field winding flows in the wrong direction the relay 16 maintains its contacts 25 open. When the switch 12 closes it also completes through its auxiliary contacts 44 the circuit of a time relay 15 across a suitable source of control current. The circuit of the time relay 15 also includes the auxiliary contacts 37 on the switch 10. If the switch 10 is not closed within a predetermined time interval after the switch 12 is closed, time relay 15 operates to open its contacts 34 and close its contacts 46. The opening of the contacts 34 effects the deenergization of the coil of switch 12 so that the generator field winding is disconnected from the exciter 14. As soon as the switch 12 opens so that its contacts 45 are closed a circuit for the coil of the switch 13 is completed across the exciter with the contacts 46 of time relay 15 in series. Switch 13, when closed, reconnects the generator field winding to the exciter so that the current now flows in the reverse direction which under the assumed conditions is the proper direction to cause the relay 16 to effect the closing of the switch 10 in the manner above described. Switch 13 by closing its contacts 32 also completes a locking circuit for itself which is independent of contacts 46 of relay 15 so that when this relay effects the opening of these contacts 46 a predetermined time after the switch 10 closes the switch 13 remains closed.

If the circuit 2 is deenergized so that the contacts 47 of relay 31 are closed when the master control switch 30 is closed, and the relay 20 is energized a circuit for coil of the control relay 26 is completed through these contacts 47 and contacts 40 of relay 20 as soon as the generator field current builds up to a sufficient value after the closing of switch 12 to effect the closing of contacts 35 of field relay 28 and the energization of the relays 20 and 21. The energization of the relay 26 effects the closing of the switch 10 in the manner above described.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an alternating current circuit, an alternating current synchronous generator, a source of excitation and means controlled by an out of phase condition between said generator and said circuit for effecting a reversal of the connections of said source of excitation to the field winding of said generator.

2. In combination, a polyphase circuit, a polyphase synchronous generator, and means for effecting a reversal of the excitation of said generator when the phase difference between said circuit and generator exceeds a predetermined amount for a predetermined time including means responsive to the relative phases of said generator and said circuit.

3. In combination, a polyphase circuit, a polyphase generator, a source of excitation for said generator, switching means for connecting said source to the field winding of said generator, means for connecting said generator to said circuit, control means responsive to a predetermined relation between predetermined electrical conditions of said circuit and generator for controlling said last mentioned connecting means, and means controlled by said last mentioned connecting means for effecting the operation of said switching means to reverse the connection of said source to the generator field winding when said control means fails to effect the operation of said connecting means to connect said generator to said circuit within a predetermined time.

4. In combination, a polyphase circuit, a polyphase generator, a source of excitation for said generator, switching means for connecting said source to the field winding of said generator, means for connecting said generator to said circuit, means responsive to the relative phase relation of said generator and circuit for controlling said last mentioned connecting means, and timing means controlled by said last mentioned means for effecting the operation of said switching means to reverse the connection of said source and generator field winding when said phase responsive means fails to effect the connection of said generator to said circuit within a predetermined time interval.

5. In combination, two alternating current circuits, a frequency converter connected to one of said circuits, said converter including a synchronous machine, means for connecting said converter to the other of said circuits, and means dependent upon the relative phase relation between said frequency converter and said other of said circuits for reversing the excitation of said machine to effect a predetermined phase relation between the voltages of said converter and said other of said circuits.

6. In combination, two alternating current circuits, a frequency converter comprising a synchronous motor connected to one of said circuits and a synchronous generator driven by said motor, means for connecting said generator to the other of said circuits, means for automatically reversing the excitation of one of the synchronous machines to effect a predetermined phase relation between said generator and said other of said circuits when said predetermined phase relation does not exist between said generator and said other of said circuits, and means for effecting the operation of said connecting means when said predetermined phase relation exists between said generator and said other of said circuits.

7. In combination, two alternating current circuits, a frequency converter comprising a synchronous motor connected to one of said circuits and a synchronous generator driven by said motor, means for connecting said generator to the other of said circuits, means dependent upon an out of phase condition between said generator and said other of said circuits for effecting a reversal of the excitation of said generator, and means dependent upon the phase relation between the voltages of said other of said circuits and said generator for effecting the operation of said connecting means when a predetermined phase relation exists between said generator and said other of said circuits.

8. In combination, two interconnected alternating current circuits of different frequencies, a frequency converter connected to one of said circuits, said converter including a synchronous machine, means for automatically connecting said converter to the other of said circuits when a predetermined phase relation exists between said converter and said other of said circuits, and means for automatcially reversing the excitation of said converter to establish said predetermined phase relation between said converter and said other of said circuits when said predetermined phase relation does not exist between said converter and said other of said circuits.

9. In combination, two interconnected alternating current circuits of different frequencies, a frequency converter comprising a synchronous motor connected to one of said circuits and a synchronous generator, means for automatically connecting said generator to the other of said circuits when a predetermined phase relation exists between said generator and said other of said circuits, and timing means controlled by said connecting means for reversing the excitation of one of said synchronous machines to establish said predetermined phase relation between said generator and said other of said circuits.

10. In combination, two interconnected alternating current circuits of different frequencies, a frequency converter connected to one of said circuits and means for controlling the connection of said converter to the other of said circuits including a device responsive to the phase difference between the voltages of said converter and said other of said circuits for effecting the connections of said converter to said other of said circuits when the phase difference is below a predetermined value, said device comprising windings connected to said converter and said other of said circuits so that when said phase difference is equal to said predetermined value the phase difference between the currents in the windings of said device is materially smaller than said predetermined value.

11. In combination, two interconnected alternating current circuits with different frequencies, a frequency converter comprising a synchronous motor connected to one of said circuits and a synchronous generator and means for controlling the connection of said generator to the other of said circuits including a relay having voltage windings respectively energized from said generator and said other of said circuits for effecting the connection of said generator to said other of said circuits when the phase difference between the voltages thereof is below a predetermined value, said windings being arranged so that when the voltages of said generator and said other of said circuits are in phase the current in the winding energized from the generator lags the current in the other winding by an amount approximately equal to one-half of said predetermined phase difference.

In witness whereof, I have hereunto set my hand this 9th day of October, 1928.

HAROLD T. SEELEY.